Oct. 16, 1962 W. K. OJALA 3,059,062
AURAL CHECK LIST
Filed June 30, 1959
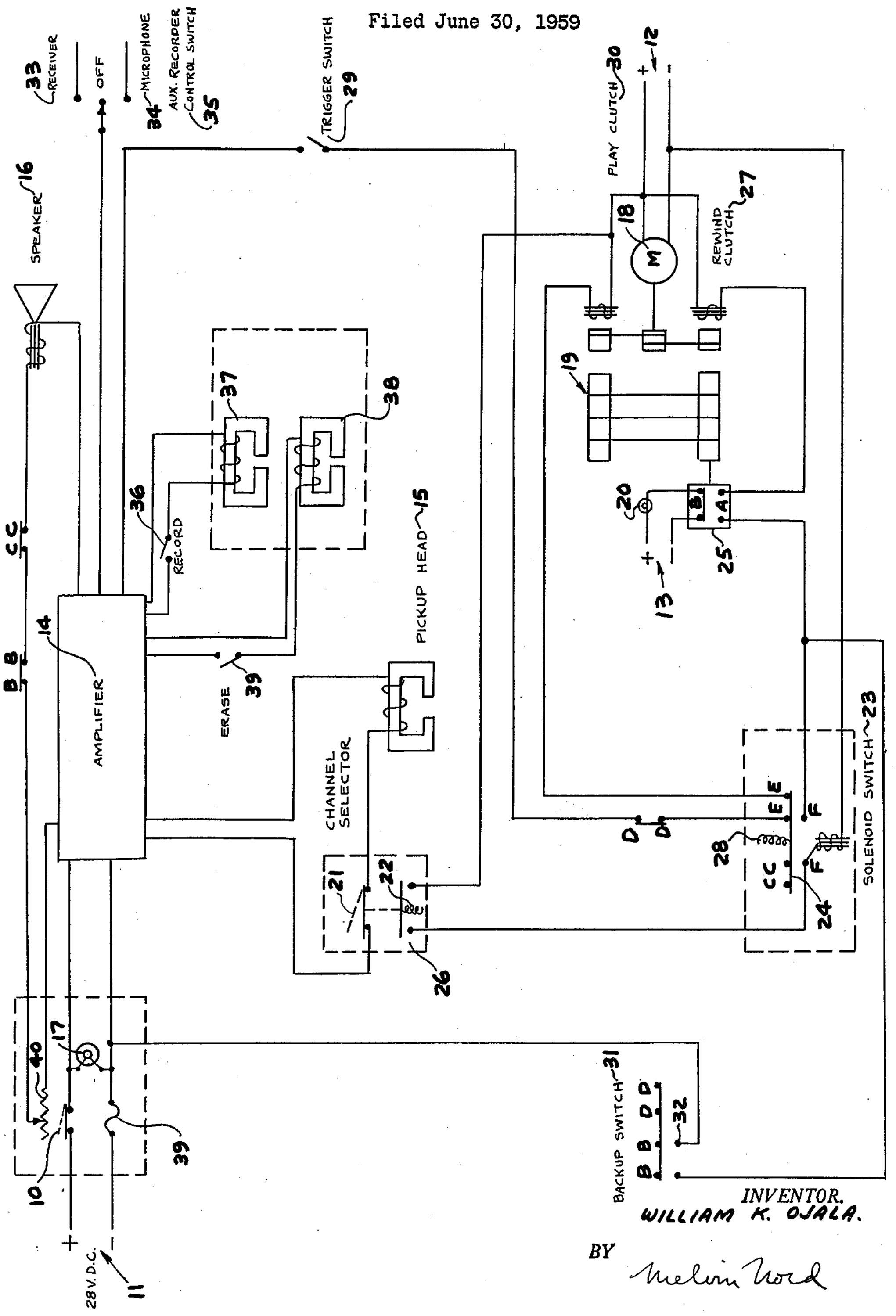
INVENTOR.
WILLIAM K. OJALA.
BY Melvin Nord
ATTORNEY 3,059,062
AURAL CHECK LIST

William K. Ojala, Dearborn, Mich., assignor of one-fourth to Melvin Nord, Detroit, Mich.

Filed June 30, 1959, Ser. No. 824,023
3 Claims. (Cl. 179—100.1)

This invention relates to annunciator systems, and is particularly applicable to aircraft. More particularly, it relates to a system for providing check list information to the pilot, co-pilot, and other crew members of an aircraft without the necessity of having the items read off by another crew member, by providing such information directly in aural form.

In the operation of aircraft, many manipulations and observations must be made in a prescribed sequence, in order to assure safe and efficient operation. This is particularly true of take-off and landing operations. In order to assure that the proper sequence is fully observed, it is customary to provide a check list of the necessary manipulations and observations in their correct sequence. In general, this is a typed or printed list on one or more sheets of paper, to which the pilot is expected to refer during operation of the aircraft. However, it is precisely during the times when such check lists are needed that the pilot cannot afford to divert his attention by referring back and forth to the check list, for example, during take-off, landing, or emergency. This is especially true during night flights, when the light in the cockpit is relatively poor. Looking at a check list in the cabin under such circumstances interferes with "night vision" and is very dangeous. Also, focussing and refocussing the eyes on printed matter and on distant objects tends to cause vertigo. The situation is rapidly becoming more critical, as the speed of aircraft becomes greater. It is clear, therefore, that requiring the pilot to read a check list may introduce serious hazards, leading to "human failure" at critical moments.

For this reason, a considerable amount of thought has been given toward improving the check list system in aircraft operation, and several patents have been issued on such improvements. For example, Clexton in U.S. 2,262,756 shows a visible check list system which can be manipulated to show either a take-off check list or a landing check list. Wells et al. in U.S. 2,259,123 show a visual signalling system for use with check lists, which presents each relevant instrument reading on a single panel. Bartlett et al. in U.S. 2,718,628 provide a visual check list system, utilizing strip film. These devices are all visual however, and therefore continue to suffer from the disadvantages referred to above.

In an effort to overcome the difficulties created by visual check lists, it is common practice to have the co-pilot read the check list to the pilot. In this way, there is no strain on the pilot's eyes or visual distraction. However, this system is far from infallible, as it may introduce other difficulties which are equally objectionable. In the first place, the chance of an error in reading or in understanding an item on the check list is doubled because two individuals are involved instead of one. Secondly, extraneous noises in the aircraft may interfere with the pilot's hearing some item read to him, or from hearing it correctly. Thirdly, the speed of reading is controlled by a person other than the one who must comprehend and act on the check list. Fourthly, the voice of the co-pilot may not be the very best type, insofar as carrying on the function of an announcer is concerned; for example, he may have a drawl or an accent which is not readily comprehensible to the pilot. Each of these disadvantages tends to render the reading of the check list by the co-pilot objectionable and to introduce the possibility of serious hazards.

The present invention provides a complete solution for these difficulties, in providing the pilot with a pre-recorded check list presenting him with the desired information in vocal form, subject to his sole control. While the use of various types of audible signals is known, so far as I am aware no aural check list has ever been proposed for use in aircraft or for any similar use.

The advantages provided by my invention include the following:

(1) It makes a check list use safer, faster, more dependable, and easier to utilize, the individual items being available in the proper sequence at the touch of a switch.

(2) It can be used by one man, without the distractions created by the use of written or visual checklists.

(3) It allows the co-pilot to concentrate on the operation of the radio, to copy clearances, or to monitor air traffic for increased safety, rather than wasting his effort in reading the check list to the pilot.

(4) It is especially valuable at night, and can be used in a dark cockpit, so that night adaptation is not jeopardized.

(5) It uses battery current, so that it can be used for cockpit pre-flights before engine start-up.

(6) It discourages skipping items on the check list.

(7) It can be used to record special check lists or instructions, as well as air traffic control clearances.

(8) It is especially valuable for pilots of single occupant combat aircraft which operate at high speeds near the ground.

(9) It can be used to record intelligence data on reconnaissance, search, and rescue flights.

(10) It is impossible to lose one's place because of interruptions.

Other objects and advantages of the invention will more fully appear from the following description and drawing, wherein is disclosed a preferred embodiment of the invention.

The system used comprises generally a wire, magnetic drum, tape, or multichannel tape recorder, operated on battery power, together with suitable controls and switches. A preferred embodiment, utilizing multichannel tape, is shown in the accompanying drawing.

Referring now in more detail to the drawing, turning the power switch 10 on supplies 28 volt D.C. power to each of the three energized lines shown, i.e. 11, 12, and 13.

The energized line 11 feeds power into the amplifier 14 which amplifies the signals from the pickup head 15 (or other pickup head), and operates the speaker 16. When the power is on, pilot light 17 indicates this. The switches BB and CC are normally closed, as shown in the speaker circuit, but under certain conditions they may be opened, as indicated below.

The energized line 12 feeds power to the motor 18 which drives the recorder 19. The motor 18 runs constantly, whenever the power switch 10 is on, thus being ready for instantaneous action.

The energized line 13 merely operates a ready light 20, which indicates when the system is ready for operation in the normal manner. This will occur only when the switch B is closed.

To operate the system, with the power switch 10 on, one selects the desired button 21 (e.g. "take-off check list," "landing check list," etc.) and pushes it in opposition to spring 22. This selects in known manner the channel of the multichannel tape which will be played by the pickup head 15. Alternatively, if single channel tape or wire is used as the recording medium, it will select the spool which will be played.

Pushing the channel selecting button 21 also provides a temporary flow of power to the solenoid hold down switch 23, from the energized line 12. This pulls the switch plate 24 down, opening the switch CC (thereby disconnecting the speaker 16) and the switch EE (thereby disconnecting the trigger circuit, described below). At the same time, switch FF is closed. Switch A is also in the closed position at this time, rather than switch B. This is preferably accomplished by means of a two-position microswitch 25 which is operated by a cam on a reduction gear, so arranged that the rewind circuit interrupter switch A is always closed and the ready light swtich B is always open except when a spool about to be played has been completely rewound. The completed rewind operates, by known means, a cam which moves the microswitch 25 to the closed B-open A position.

Thus, pushing the desired button 21 to select a channel (or spool) causes power to be fed from the positive side of the energized line 12 through switches 26, FF, and AA to the rewind clutch 27. This causes the motor 18 to rewind the recorder 19 by known means. Switch plate 24—meanswhile continues to be held down in the closed FF position by virtue of the power which continues to be drawn from the energized portion 12 of the circuit through the rewind clutch 27, through switch AA, through switch FF, and through the solenoid 23.

Thus, the rewind cycle continues until its reaches its end, whereupon the microswitch 25 is mechanically actuated to open switch A and close switch B. The latter causes the ready light 20 to be illuminated, indicating that rewinding has been completed and the system is ready for operation. The former permits the switch plate 24 to be pulled upwardly by spring 28, opening switch FF and closing switches CC and EE. Closing switch CC again places the speaker 16 in the circuit, and closing switch EE places the trigger switch 29 into the system. The system is now ready for operation, to play the selected check list aurally. Since the rewinding operation can be conducted, by known means, at a relatively high speed as compared with the preferred playing speed, this automatic rewinding operation can be accomplished very rapidly, so as to avoid any substantial delay, particularly in view of the fact that check lists will normally require relatively short lengths of tape or wire.

To use the selected check list, the pilot simply presses the trigger switch 29. This permits power to be drawn to the play clutch 30 from the positive side of line 12 and the negative side of line 11 (indicated schematically as being taken from the amplifier box 14). Thus, pressing the trigger switch 29 actuates the play clutch 30, thus causing the motor 18 to play the recorder 19 by known means. As a result, the pre-recorded check list is read off aurally while the trigger switch is pressed. Releasing the trigger stops the recorder while the necessary flight operation is carried out. Then, when the next item of the check list is desired, the pilot presses the trigger switch again.

If it is desired to repeat some item of the check list, the pilot presses the back up switch 31. This opens switch BB (thereby disconnecting the speaker 16 from the system), and also opens switch DD (thereby breaking the trigger circuit). At the same time, it bypasses the solenoid switch 23 by closing switch 32. Since switch A is in its normally closed position (because the spool is not in its completely rewound position), power is drawn to the rewind clutch 27 from the positive side of line 12 and the negative side of line 11, thus rewinding the spool. This rewinding operation takes place, however, only so long as the backup switch 31 continues to be presssed, i.e. only so long as desired. When the backup switch 31 is released, the circuits are restored to their normal "play" positions, and the pilot may continue the check list in the normal manner.

At the completion of the check list, the pilot may push the selector button for the next desired channel, and the above procedure may then be repeated, starting with the automatic rewinding.

If it is desired to record air traffic control clearances or other information (either from the receiver 33 or by speaking into the microphone 34), the auxiliary recorder control switch 35 is moved to the desired position, a recording channel is selected, record switch 36 is closed, and the trigger switch 29 is pressed. The wire or tape passes through the recording head 37 and the erasing head 58. (However the erase circuit is inactivated at this time, preferably by an interlock with the record circuit.) Thus, the pilot can record either special information or clearances spoken by either the operator or the tower controller.

To play back such recorded information, subsequently, the appropriate selector button is pushed, the wire or tape is automatically rewound, and when the ready light 20 comes on, the trigger switch can be depressed to play back the recorded information.

To erase recorded information, the erase switch 39 is closed and the record switch 36 opened. The appropriate selector button is pushed for the recording to be erased, and the channel is erased while either winding or rewinding. Check lists cannot be erased by the operator.

Also shown in the diagram is a fuse 39 for the power line, and a volume control rheostat 40.

While I have thus described a preferred embodiment of my invention, it is understood that various modifications may be made in the details of the system without departing from the spirit of the invention, the novel features of which are set forth in the following claims.

I claim.

1. An aural check list system comprising in combination: a plurality of check lists prerecorded as signals on rotary aural recording means, each of said check lists comprising a sequence of individual items of instruction to be complied with in a predetermined order by the hearer, and prerecorded in said order on said recording means, with appropriate intervals therebetween; an aural reproduction system for playing said recording means and converting the signals recorded thereon into corresponding aural messages; an electrical power supply system, amplifying system, and motor means for operating said aural reproduction system; electrical switch and circuit means for selecting any desired prerecorded check list and automatically rewinding it; electrical switch means for playing said aural check list and for interrupting it in the intervals between individual items of instruction; means for automatically terminating rewinding when said recording means is completely rewound, for immediately restoring the system to readiness for playing said recording means through said aural reproduction system, and for signalling such readiness; and separate means for recording and erasing information other than the aforesaid prerecorded check lists, without permitting erasure of said prerecorded check lists.

2. An aural check list system comprising in combination: a plurality of check lists prerecorded as signals on rotary aural recording means, each of said check lists comprising a sequence of individual items of instruction to be complied with in a predetermined order by the hearer, and prerecorded in said order on said recording means, with appropriate intervals therebetween; an aural reproduction system for playing said recording means and converting the signals recorded thereon into corresponding aural messages; an electrical power supply system, amplifying system, and motor means for operating said aural reproduction system; electrical switch and circuit means for selecting any desired prerecorded check list, and automatically rewinding it, comprising a plurality of channel selector switches, a solenoid hold-down switch actuated into hold-down closed position by the temporary closing of a channel section switch and a rewind clutch adapted to rewind the selected aural check list, actuated by the closing of said solenoid switch; switching means automatically operable upon the termination of complete rewinding to interrupt the flow of current to said solenoid switch and to permit it to open and also operable to close a switch actuating a signal indicating readiness of the system for playing the selected aural check list through said aural reproduction system; and electrical switch means for playing said aural check list and for interrupting it in the intervals between individual items of instruction.

3. In an aural check list machine, the combination of a plurality of check lists prerecorded as signals on rotary aural recording means, each of said check lists comprising a sequence of individual items of instruction to be complied with in a predetermined order by the hearer, and prerecorded in said order on said recording means, with appropriate intervals therebetween; an aural reproduction system for playing said recording means and converting the signals recorded thereon into corresponding aural messages; an electrical power supply system, amplifying system, and motor means for operating said aural reproduction system; electrical switch and circuit means for selecting any desired prerecorded check list and automatically rewinding it; electrical switch means for playing said aural check list and for interrupting it in the intervals between individual items of instruction; and means for automatically terminating rewinding when said recording means is completely rewound, for immediately automatically restoring the system to readiness for playing said recording means through said aural reproduction system, and for signalling such readiness.

References Cited in the file of this patent

UNITED STATES PATENTS

| | | |
|---|---|---|
| 2,770,680 | Somers | Nov. 13, 1956 |
| 2,821,576 | Gaubert | Jan. 28, 1958 |
| 2,874,219 | Cavanaugh | Feb. 17, 1959 |